United States Patent
Paris Escribano et al.

(10) Patent No.: US 11,981,570 B2
(45) Date of Patent: May 14, 2024

(54) REDUCED GRAPHENE OXIDE MIXTURE, POLYMER MATRIX CONTAINING THE SAME AND A PROCESS FOR THE PREPARATION THEREOF

(71) Applicant: GRAPHENEA S.A., Donostia-San Sebastian (ES)

(72) Inventors: Rodrigo Paris Escribano, Madrid (ES); Carolina Ruiz Orta, Madrid (ES); Amaia Zurutuza Elorza, Donostia-San Sebastian (ES); Amaya Ortega Murguialday, Donostia-San Sebastian (ES); Beatriz Alonso Rodriguez, Donostia-San Sebastian (ES)

(73) Assignee: GRAPHENEA S.A. (ES)

( * ) Notice: Subject to any disclaimer, the term of this patent is extended or adjusted under 35 U.S.C. 154(b) by 696 days.

(21) Appl. No.: 16/963,474

(22) PCT Filed: Jan. 23, 2019

(86) PCT No.: PCT/EP2019/051671
§ 371 (c)(1),
(2) Date: Jul. 20, 2020

(87) PCT Pub. No.: WO2019/145378
PCT Pub. Date: Aug. 1, 2019

(65) Prior Publication Data
US 2021/0047187 A1   Feb. 18, 2021

(30) Foreign Application Priority Data
Jan. 23, 2018  (EP) .................................. 18382036

(51) Int. Cl.
*C01B 32/198* (2017.01)
*B82Y 30/00* (2011.01)
(Continued)

(52) U.S. Cl.
CPC ............ *C01B 32/198* (2017.08); *B82Y 30/00* (2013.01); *B82Y 40/00* (2013.01); *C01B 32/184* (2017.08);
(Continued)

(58) Field of Classification Search
CPC ..... C01B 32/198; C01B 32/184; B82Y 30/00; B82Y 40/00; C08K 3/042; C08L 57/00; C08L 87/00
See application file for complete search history.

(56) References Cited

U.S. PATENT DOCUMENTS 10,230,111 B2 * 3/2019 Yang ..................... H01M 4/625

FOREIGN PATENT DOCUMENTS

| EP | 2 960 205 A1 | 12/2015 |
| EP | 3 205 624 A1 | 8/2017 |

(Continued)

OTHER PUBLICATIONS

Varela et al (A quantitative analysis of the dispersion behavior of reduced graphene oxide in solvents, Science Direct, 2014) (Year: 2014).*

(Continued)

*Primary Examiner* — Colin W. Slifka
*Assistant Examiner* — Logan Edward Laclair
(74) *Attorney, Agent, or Firm* — Snell & Wilmer LLP

(57) ABSTRACT

The present invention is directed to a suspension and to a wet powder of reduced graphene oxide (rGO) and an organic solvent, wherein the concentration of the reduced graphene oxide in organic solvent is above 0.3 mg/mL, and wherein the mixture is stable for at least 5 days as measured in a Turbiscan™. The invention further discloses a polymer matrix comprising the rGO of said rGO suspension or wet powder and a polymer, and methods for the preparation of the rGO suspension or wet powder and the polymer matrix.

6 Claims, 4 Drawing Sheets

(51) Int. Cl.
  *B82Y 40/00* (2011.01)
  *C01B 32/184* (2017.01)
  *C08K 3/04* (2006.01)
  *C08L 57/00* (2006.01)
  *C08L 87/00* (2006.01)

(52) U.S. Cl.
  CPC .............. *C08K 3/042* (2017.05); *C08L 57/00* (2013.01); *C08L 87/00* (2013.01)

(56) References Cited

FOREIGN PATENT DOCUMENTS

| KR | 2012 0049679 A | 5/2012 |
| WO | WO 2017/081688 A1 | 5/2017 |

OTHER PUBLICATIONS

Ayan-Varela M et al: "A quantitative analysis of the dispersion behavior of reduced graphene oxide in solvents" ScienceDirect, Carbon, vol. 75, Apr. 12, 2014 (Apr. 12, 2014), pp. 390-400.
Anonimous: "Graphene Shop-Reduced graphene oxide", Sep. 13, 2016 (Sep. 13, 2016), XP055564325, Retrieved from the Internet: URL:https://web.archive.org/web/20160913075733/http://www.grapheneshop.pl:80/product/reduced-graphene-oxide-paste/; 5 pages.
John Texter: "Graphene dispersion", Current Opinion in Colloid And interface Science, vol. 19, No. 2, Apr. 1, 2014 (Apr. 1, 2014), pp. 163-174.
European Patent Office, PCT International Search Report and Written Opinion, PCT/EP2019/051671, dated Mar. 25, 2019, 15 pages.

\* cited by examiner

STABILITY

PARTICLES MIGRATION

PARTICLES SIZE VARIATION

REDUCED GRAPHENE OXIDE MIXTURE, POLYMER MATRIX CONTAINING THE SAME AND A PROCESS FOR THE PREPARATION THEREOF

FIELD OF THE INVENTION

The present invention relates to a stable mixture of a solvent and a reduced graphene oxide (rGO), its preparation method, a polymer matrix comprising the rGO and an article comprising said polymer matrix.

BACKGROUND

Graphene has attracted great interest for its excellent mechanical, electrical, thermal and optical properties. It can be produced by various methods, such as for example, micro-mechanical exfoliation of highly ordered pyrolytic graphite, epitaxial growth, chemical vapor deposition, and the reduction of graphene oxide (GO). A key topic in the research and applications of GO is the reduction, which partly restores the structure and properties of graphene. Different reduction processes have been proposed for obtaining rGO, which do not provide satisfactory results.

M. J. Fernández-Merino, et al., *J. Phys. Chem.* (2010), discloses vitamin C as an ideal substitute for hydrazine in the reduction of graphene oxide suspensions. The document discloses stable suspensions, but having a maximum rGO concentration of only 0.1 mg/mL. Such low concentrations offer many problems for practical applications. In particular, suspensions of graphene oxide at a concentration of 0.1 mg/mL were reacted with vitamin C, at 95° C. When the solvent used was water, the pH of the dispersions was adjusted to ~9-10. No high shearing is disclosed.

One of the major problems in the reduction of graphene oxide is the tendency of its flakes to form agglomerates, especially as the concentration of the suspensions is increased. Harnessing the exceptional physical properties of graphene often requires its dispersion into very low concentration aqueous or organic media. Dispersion must be achieved at a concentration and stability appropriate to the final application. However, the strong interaction between graphene sheets means it disperses poorly in all but a few high boiling organic solvents. Therefore, a truly versatile rGO commercial product must be stable.

CN105271191 A discloses reduced graphene oxide, as well as a preparation method and an application thereof. The preparation method comprises the following preparation steps: vitamin C is added to a 1:1000 (0.1 mg/mL) weight aqueous solution of graphene oxide solution; uniform mixing is performed; then ammonia water is added; uniform mixing is performed; the mixture is heated to the temperature of 90-100° C.; filtration is performed after the reaction and the filter cake is washed with deionized water to be neutral and dried to obtain the dry reduced graphene oxide.

EP2960205 A1 relates to a stable aqueous graphene suspension and its use in producing graphene polymer nanocomposites. No disclosure is provided of a highly concentrated suspension in an organic solvent. The authors prove that a polymer filled with graphene material may be obtained by intimate mixture of graphene material and monomers before promoting an in situ polymerization, by using an aqueous graphene suspension stabilized with an anionic surfactant. In particular, it discloses an aqueous graphene suspension comprising: a liquid suspension medium comprising more than 50% by weight of water with respect to the total amount of liquid suspension medium; at least one graphene material; and at least one anionic surfactant with a part thereof being present as functionalizing said graphene material, wherein the weight percentage of anionic surfactant with respect to the amount of graphene material is at most equal to 100%. Therefore, this document does not provide highly concentrated rGO suspensions, and in any case, requires surfactants. It further relates to a process for preparing an aqueous chemically reduced graphene oxide suspension and to a process for manufacturing a graphene material-polymer nanocomposite, and more specifically a chemically reduced graphene oxide-polymer nanocomposite from an aqueous graphene material suspension, and more specifically an aqueous chemically reduced graphene oxide (CRGO) suspension and monomer(s), said process comprising at least the steps consisting in: (A) an addition of monomer(s) to a suspension, and (B) a polymerization of said monomer(s) to yield said nanocomposite. The whole process thus requires in situ polymerization.

EP3205624A1 refers to the preparation of a highly dispersable graphene powder, having a high specific surface area. This is achieved by the use of a surface treatment agent having an acidic group during the reduction treatment of graphene oxide.

David W. Johnson, et al., *Curr. Opin. Colloid In.* (2015), discusses several dispersion (or suspension) strategies. In particular, the effect of shear, solvent and chemical modifications on graphene dispersion is discussed. Further, Johnson et al., disclose that the dispersion of graphene in hydrophobic and polymer engineering products is a challenge. The first problem is to achieve good dispersion in the polymer. This is addressed either by dispersing the graphene in a co-solvent with the polymer prior to co-precipitation or drying to a film, or by dispersing the graphene in a monomer, followed by in situ polymerization. Therefore, this document does not address the problem of providing highly concentrated rGO in a solvent. In an ideal situation, solvent processed composites lock the graphene into its well dispersed form in the solvent; however, it is generally necessary to modify the graphene to improve its dispersibility and its interaction with the polymer matrix.

Recently Liu et al., *RSC Adv.* (2014) used a high shear mixer in molecular-level mixing (MLM) methods of rGO/Cu composites in aqueous solutions, which were then dried and sintered. No disclosure of a highly concentrated rGO suspension in an organic solvent is provided.

Liu et al. *RSC Adv.*, 2014, 4, 36464-36470, discloses a suspension of 0.27 mg/mL of rGO in a 40% IPA/water solution. The method comprises high-shearing the rGO already produced in the IPA/water solution. No disclosure of a highly concentrated rGO suspension in an organic solvent is provided.

Lidong Wang, et al., RSC Adv. (2015) also recognizes that graphene agglomerates remain a major challenge to produce composites. In addition, the authors mention that mixing using high shear is a general method used in chemistry and in the food industries, including deaglomeration, emulsification and homogenization processes. The high shear blend is usually used to disperse nanoparticles by breaking the agglomerates of the nanoparticle into a liquid. The authors refer to Paton et al., who showed that the high shear blend could also be used to exfoliate suspensions from graphite to graphene. However, the authors do not recognize the possibility of preparing a highly concentrated rGO suspension in an organic solvent.

M. Ayán-Varela, et al., *CARBON*, 2014, 75, 390-400, discloses an analysis of the dispersion behaviour of reduced graphene oxide in solvents. Problems regarding precipitation and agglomeration of the reduced graphene oxide are described. Standard methodologies for the reduction of graphene oxide are used, such as those disclosed in Li D, et al, *Nat Nanotechnol.* 2008, 3(2), 101-5, and Fernández-Merino, et al., *J. Phys. Chem. C,* 2010, 114 (14), 6426-6432.

Thus, a demand still remains in the art for providing highly concentrated forms of rGO and for improved processes for the preparation of rGO, specifically for providing an rGO without the agglomeration typically observed during the chemical reduction of graphene oxide, and yielding rGO with improved dispersibility in polymeric matrixes.

SUMMARY

The present inventors have found that by performing the reduction reaction of graphene oxide under high shear mixing and preventing the graphene from drying, and cleaning with a solvent, the resulting reduced graphene oxide (rGO) mixed with solvent is surprisingly stable, even in highly concentrated suspensions. Said suspensions are surprisingly stable, and do not require the use of surfactants.

High shearing of the reduction reaction of graphene oxide (GO) considerably improves the kinetics of the reaction, significantly lowering reaction times required to complete the reduction. In addition, the material produced is exfoliated due to the high shear, thus avoiding its agglomeration, i.e., a reduction in the particle size of the reduced graphene oxide is achieved. More importantly, the rGO remains surprisingly exfoliated for long periods of time. Thus, a first aspect of the invention is a process for the preparation of a suspension of a reduced graphene oxide in an organic solvent, wherein the concentration of the reduced graphene oxide is above 0.3 mg/mL, preferably comprised between 0.3 mg/mL and 20.0 mg/mL, for example, between 0.3 mg/mL and 15.0 mg/mL (with respect to the total amount of suspension or mixture) and wherein the suspension is stable for at least 5 days as measured in a Turbiscan™ (stable meaning that the variation of the transmittance measured in the Turbiscan™ is less than 10% after 5 days, as further explained later on), said process comprising the steps of:
  (a) reacting a graphene oxide aqueous dispersion at a temperature comprised between 60° C.-150° C. at a pH of 7.0 or more, in the presence of a reducing agent, under high shear to reduce the reaction time required to complete the reduction, and to reduce the particle size of the reduced graphene oxide, to obtain an aqueous reduced graphene oxide suspension;
  (b) cleaning the aqueous reduced graphene oxide suspension resulting from step (a) with an organic solvent so that the concentration of reduced graphene oxide is always above 0.3 mg/mL with respect to the total mixture, to obtain a wet powdered reduced graphene oxide, preferably, having a concentration above 15.0 mg/mL, for example comprised between 16.0 mg/mL and 25.0 mg/mL; and
  (c) re-dispersing the wet powdered reduced graphene oxide obtained in step (b) in an organic solvent to obtain the suspension.

The suspension resulting from step (c) is stable for at least 5 days as measured in a Turbiscan™. To the best of our knowledge, this is the first time such stable rGO at such high concentration has been obtained.

Accordingly, a second aspect of the invention is a suspension of reduced graphene oxide in an organic solvent, wherein the concentration of the reduced graphene oxide is above 0.3 mg/mL, preferably, comprised between 0.3 mg/mL and 20.0 mg/mL, for example, between 0.3 mg/mL and 15.0 mg/mL, and wherein the mixture or suspension is stable for at least 5 days as measured in a Turbiscan™ (stable stable meaning that the variation of the transmittance measured in the Turbiscan™ is less than 10% after 5 days, as further explained later on). Said mixture or suspension displays excellent morphology, with a very small particle size and a large proportion of single layered sheets.

Even further, the inventors have confirmed that even the intermediate wet powdered reduced graphene oxide obtained in step (b) can remain stable for long periods of time as long as it is not allowed to dry, and, more surprisingly, it is readily and efficiently dispersed in polymers. It is therefore a further aspect of the invention is a process for the preparation of a wet powdered reduced graphene oxide in an organic solvent, having a concentration of more than 15.0 mg of reduced graphene oxide per mL (with respect to the whole amount of wet powdered reduced graphene oxide), preferably, between 15.0 mg/mL and 60.0 mg/mL, for example, between 15.0 and 25.0 mg/mL, and which is obtainable by a process comprising the steps of:
  (a) reacting a graphene oxide aqueous dispersion at a temperature comprised between 60° C.-150° C. at a pH of 7.0 or more, in the presence of a reducing agent, under high shear to reduce the reaction time required to complete the reduction, and to reduce the particle size of the reduced graphene oxide, to obtain a reduced graphene oxide suspension;
  (b) cleaning the aqueous reduced graphene oxide suspension resulting from step (a) with an organic solvent so that the concentration of reduced graphene oxide is always above 0.3 mg/mL with respect to the total mixture, and adjusting the final amount of organic solvent to obtain the wet powdered reduced graphene oxide.

Further aspects of the invention are the wet powdered reduced graphene oxide obtained by the above process, as well as a wet powdered reduced graphene oxide in an organic solvent, having a concentration of reduced graphene oxide of more than 15.0 mg/mL, wherein the d90 particle size of reduced graphene oxide as measured by laser diffraction is between 2 and 70 microns.

Furthermore, the inventors have found that the obtained suspension of rGO provides a polymeric matrix, when the rGO of the invention is mixed with a polymer, in which the rGO is more efficiently dispersed, while largely maintaining its monolayer structure. Even more surprisingly is the fact that even the intermediate wet powdered reduced graphene oxide obtained after cleaning in step (b) is also capable of efficiently being dispersed in polymers. The opportunity is thus open to provide a stable rGO form with extended shelf life that can be used in various applications. Once mixed in the polymer matrix, the rGO, whether obtained from the suspension or the wet powder, maintains its morphologic properties and is well dispersed in the polymer matrix. Thus, in a third aspect, the invention relates to a polymer matrix comprising a polymer and the rGO contained in the suspension or in the wet powder as defined above.

The preparation of the polymer matrix becomes a very simple procedure, wherein the polymer is mixed with the suspension or the wet powder, which is a further aspect of the invention.

In a further aspect, the invention relates to an article comprising the polymeric matrix comprising rGO, according to the invention.

Figure 1:
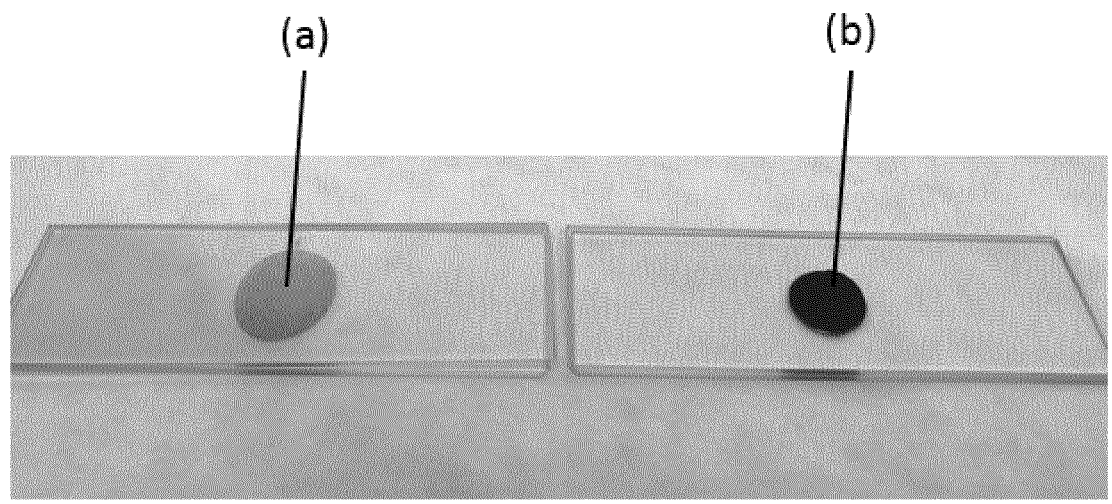
FIG. 1: Macroscopic picture of an rGO mixed with a polymer matrix. Sample (a): rGO dried in a standard vacuum oven and then mixed with the polymer. Sample (b): rGO according to the invention in the form of a suspension and mixed with the polymer and heated to evaporate the solvent. It is visible to the naked eye that in sample (b) the rGO is totally integrated in the matrix, whereas in the sample (a) the rGO displays numerous agglomerates.

Source: leaflet explaining the Turbiscan™ technology.

DETAILED DESCRIPTION OF THE INVENTION

The mixtures described herein can thus form a suspension or a "wet" powder, depending on the concentration of rGO. Thus, at high concentrations of rGO, for example above 15.0 mg/mL, the mixture is typically a wet powder, but at lower concentrations it typically forms a suspension.

In the frame of the present invention, when a concentration of rGO mixture is indicated in mg/mL, it is meant that per mL of mixture (i.e., rGO suspension or wet powdered rGO of the invention), the indicated amount of mg are contained. This may be measured, for example, but not limited to, by taking a given amount of mixture (e.g., 1000 mL), evaporating the organic solvent (or eliminating it by any other known method), and weighting the remaining rGO. Based on the measurement, the concentration in mg/mL may be easily calculated.

The concentration of the reduced graphene oxide in the suspension according to the invention is above 0.3 mg/mL (i.e., 0.3 mg of rGO are contained in 1 mL of rGO suspension), and therefore may be, for example, above 0.4 mg/mL, or above 0.5 mg/mL, or above 1 mg/mL, or above 2.0 mg/mL, or above 3.0 mg/mL, or above 4.0 mg/mL, or above 5.0 mg/mL, or above 6.0 mg/mL, or above 6.5 mg/mL.

As defined later on, if the concentration of the reduced graphene oxide is above 15.0 mg/mL, the product is designated as wet powdered reduced graphene. Therefore, the concentration of the reduced graphene oxide in the suspension is generally up to 15.0 mg/mL, or up to 13.0 mg/mL, or up to 12.0 mg/mL, or up to 10.0 mg/mL, or up to 8.0 mg/mL. At higher concentrations, the mixture is designated as wet powdered reduced graphene.

Any combination of upper and lower limits, within the indicated range, is intended to be included in the present application.

For example, the concentration of the reduced graphene oxide in the suspension is, for example, but not limited to, comprised between 0.3 mg/mL and 15.0 mg/mL, for example in one of the following ranges: between 0.3 mg/mL and 12.0 mg/mL, between 0.3 mg/mL and 10.0 mg/mL, between 0.4 mg/mL and 13.0 mg/mL, between 0.5 mg/mL and 15.0 mg/mL, between 1.0 mg/mL and 10.0 mg/mL, between 2.0 mg/mL and 10.0 mg/mL, between 3.0 mg/mL and 12.0 mg/mL, between 4.0 mg/mL and 10.0 mg/mL, between 5.0 mg/mL and 8.0 mg/mL, between 6.0 mg/mL and 10.0 mg/mL or between 6.5 mg/mL and 10.0 mg/mL.

In the present invention "wet" in the term "wet powder" refers to the organic solvent which is present. Thus, a wet powdered reduced graphene oxide, or wet rGO, or wet powder, refers to a solid rGO containing varying amounts of solvent, the concentration being more than 15 mg/mL (i.e., more than 15 mg of rGO per 1 mL of wet powdered reduced graphene oxide), and therefore may be, for example, above 16 mg/mL, or above 20 mg/mL, or above 25 mg/mL. Generally, the concentration will not be more than 50.0 mg/mL, for example, up to 40.0 mg/mL, or up to 25.0 mg/mL. The wet powder can have a concentration of the reduced graphene oxide, for example, but not limited to, comprised between 16.0 mg/mL and 250.0 mg/mL, for example in one of the following ranges: between 16 mg/mL and 100.0 mg/mL, between 16 mg/mL and 50.0 mg/mL, between 20.0 mg/mL and 60.0 mg/mL between 20.0 mg/mL and 50.0 mg/mL or between 20.0 mg/mL and 25.0 mg/mL.

As indicated above, the suspension of reduced graphene oxide in an organic solvent according to the invention is stable for at least 5 days as measured in a Turbiscan™. The Turbiscan™ is an optical dispersion analyzer, which is world widely used in order to characterize the dispersion state of emulsions, suspensions, dispersions, foams, etc, and is based on static Multiple Light Scattering (https://www.labcompare.com/Laboratory-Analytical-Instruments/25100-Stability-Analyzers/). Changes in terms of size and concentration (such as for example creaming, sedimentation, flocculation or coalescence) are monitored. The technique consists in sending photons (light) into the sample, for example, IR light; these photons, after being scattered many times by objects in suspension (droplets, solid particles, gas bubbles . . . ) emerge from the sample and are detected by the measurement device (which is a transmittance detector) of the Turbiscan™. These measurements allow to follow the evolution of the average particle diameter or concentration during the ageing of the product in any part of the sample, and thus the stability of the sample along time, when a sample is measured in a Turbiscan™ right after preparation, and at different points of time thereafter. A stable sample displays a flat curve over time, meaning that the transmittance through the sample does not change over time, and therefore the particles are evenly distributed throughout the suspension with no significant changes at any given point. As the suspension becomes unstable, the particles start to aggregate and deposit towards the bottom of the cell. As a result, the measured transmission changes over time.

Figure 5:
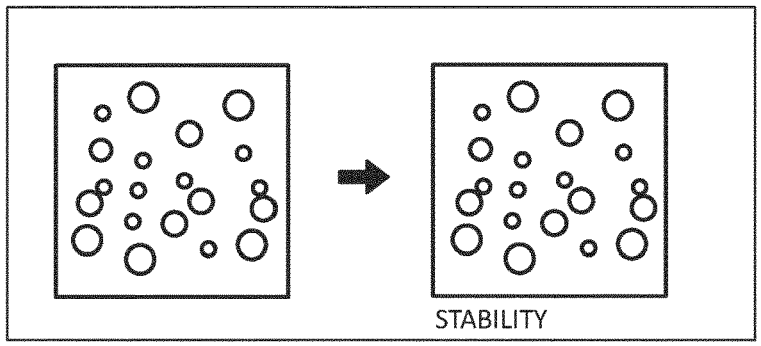
FIG. 5: graphic representation of stability and instability of emulsions, suspensions, dispersions, etc: in stable preparations, the particles remain dispersed in the solvent; in unstable preparations, creaming, sedimentation, flocculation or coalescence occurs.
Figure 5:
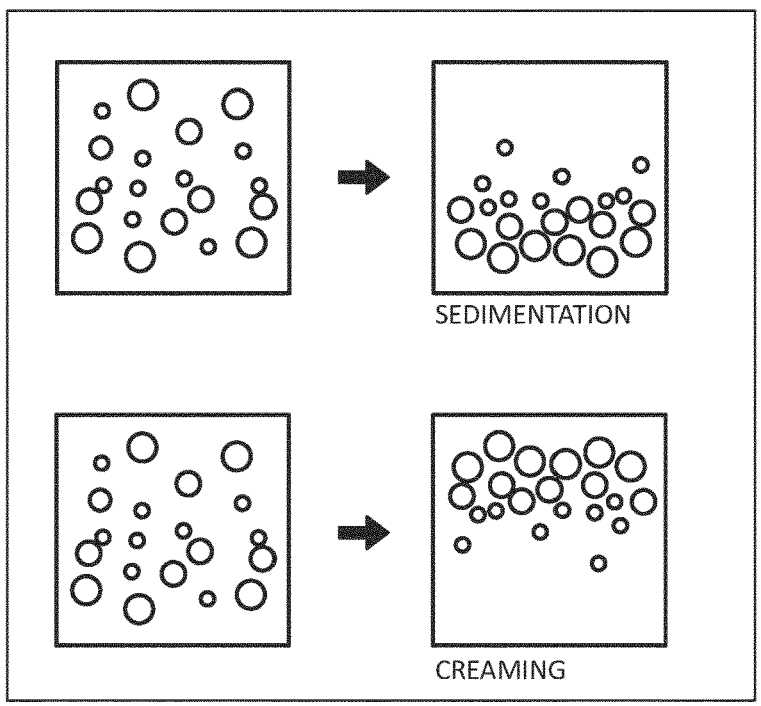
Figure 5:
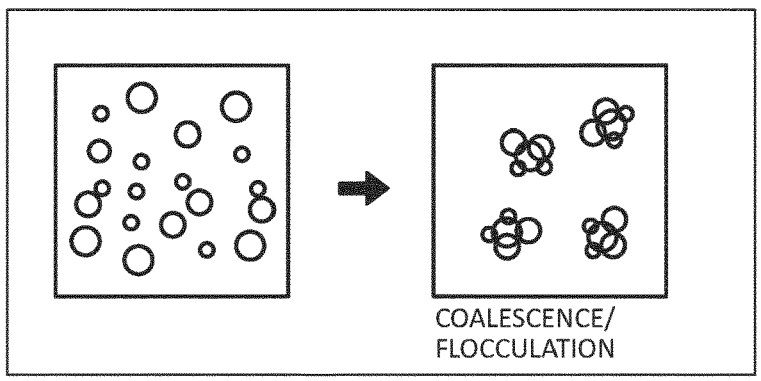

In the present invention, samples were allowed to stand at 25° C. in the dark for different periods of time, ranging from a few minutes to months. All measurements were performed at 25° C. and 1 atm, and always under the same conditions for a given sample. A sample was considered stable if the variation of the transmittance was less than 10% after 5 days (both if comparing measurements at different times, throughout the suspension, and also if comparing, at the same time, measurements at different sites or parts of the sample (thus determining whether e.g. sedimentation or creaming has occurred; please refer to FIG. 5). All mixtures prepared according to the invention under high shear (entries 3, 4, 5 and 6 of Table 1) were stable for at least 5 days under the above conditions. On the other hand, mixtures prepared under standard conditions (comparative entries 1 and 2 of Table 1) were unstable, even after only a few hours.

Suitable organic solvents for the mixture of the invention are selected from the group of EtOH, MeOH, iPrOH, BuOH, $CH_2Cl_2$, $CHCl_3$, ethyl ether, Etyl acetate, DMF, NMP, DMSO. Preferably the solvents are selected from the group of N,N'-dimethylformamide (DMF), N-methylpyrrolidine (NMP) and alcohols. Preferred solvents are alcohols selected from the group of methanol, ethanol and isopropanol. More preferably methanol is the solvent of choice. The organic solvent can be a single solvent or a mixture of two or more. In the suspension or wet powder of the invention it is preferable that substantially all the solvent is organic solvent, although some residual water can be present. However, it is possible to prepare mixtures of the invention wherein more than 80% by volume of the solvent, with respect to the total volume of solvent, is an organic solvent, for example, more than 90%, preferably, more than 95%.

A further contribution to achieving the object of the present invention is made by a polymeric matrix comprising the rGO of the present invention and a polymer.

According to the present invention, the polymer can be a liquid polymer at room temperature or soluble in the solvent used in the suspension or wet powder of the invention. For example, a polyol, a silicone or a polyester. The inventors have obtained liquid polymer matrixes (e.g. in polyols) that are stable for at least 15 days as measured in the Turbiscan™. Polyols can be selected from the group consisting of filled polyols (also known as polymer polyols), polyisocyanate polyaddition (PIPA) polymer polyols, polytetrahydrofuran (Polytetramethylene Glycols), polyester polyols, poly(caprolactone)polyols, polycarbonate Polyols, polybutadiene polyols, acrylic polyols, polysiloxane polyols, polyether polyols for rigid polyurethane Foams (Aminic Polyols), rigid polyols based on the alkoxylation of aromatic compounds, condensates with aldehydes (Mannich polyols), Novolak-based polyether polyols, bisphenol A based polyols, resorcinol based diols, melamine-based polyols for rigid polyurethanes, aromatic polyester polyols from polyethylene terephthalate wastes (bottles, films, fibres), aromatic polyester polyols based on phthalic anhydride, polyols from renewable sources, oleochemical polyols, flame retardant polyols, chlorine and bromine containing polyols, phosphorus polyols, esters of ortho-phosphoric acid, esters of phosphorus acid, phosphonate polyols, phosphine oxide polyols, phosphoramidic polyols, hyperbranched polyols and dendritic polyols, and oligo-polyols derived from chemical recovery (e.g. from PU wastes, from hydrolysis of PU polymers, from glycolysis of PU Polymers, from aminolysis of PU Polymers).

Any polymer with which the suspension or the wet powder of the invention can form a blend is suitable. Non-limiting exemplary polymers can be chosen from the group consisting of an olefin, an acrylic polymer, a styrenic or a vinyl polymer and copolymers thereof, a polyether, a polyamide (e.g. a thermoplastic polyamide), a polyacetal, a polycarbonate, a polyester, a polyurethane, an LCP (Liquid Crystal Polymers), a polyhydroxyalkanoate (PHA), a PEEK (Polyaryletheretherketone), an ABS (acrylonitrile butadiene styrene), a polyether sulfone (PES), a PA (Polyamide), a PSU/P/PPSU (Polyarylsulfone), a POM (Polyoxymethylene), a PPA (Polyphthalamide), a PPS (Polyphenylene sulfide), a fluoropolymer (e.g. Polyvinylidene fluoride) and mixtures thereof. For example, the polymer is polylactic acid (PLA), ethylene-vinyl alcohol (EVOH), polyethyelene terephthalate (PET), polyvinyl alcohol (PVOH), PBT (Polybutylene Terephthalate), PMMA (polymethyl methacrylate), polyvinyl chloride (PVC), ANS (acrylonitrile styrene), PEI (polyetherimide) or mixtures thereof.

Polyolefins can be selected from homopolymers and copolymers. For example, polypropylene, HDPE, LLDPE, LDPE, UHMWPE, ethylenevinylacetate (EVA) copolymer, ethylenemethylacrylate (EMA) copolymer, ethylenemethylmethacrylate (EMMA) copolymer, ethyleneethylacrylate (EEA) copolymer, ethylenepropylacrylate copolymer or ethylenebutylacrylate (EBA) copolymer.

Further, the polymer can be chosen from the group consisting of polyols, epoxy resins, polyesther resins, polyurethanes, natural rubbers, polyisoprenes, polychloroprenes, polyacrilates, starch, polyamides, and mixtures thereof. Excellent stability and dispersability have been obtained, for example, with polyol polyethers and the polyurethanes resulting from their reaction with polyisocyanates.

Also, the polymer can be chosen from the group consisting of a polyalkylene carbonates (PAC), a block/random copolymer comprising at least one polyolefin, polyacrylic, polystyrenic, polyvinyl, polyether, polyamide, polyester, or polyurethane block therein, and an elastomer.

PAC derives (either by being actually used or notionally) from one or more epoxides selected from the group consisting of $(C_2-C_{20})$alkyleneoxide, $(C_1-C_{20})$alkyloxy, $(C_6-C_{20})$aryloxy, $(C_6-C_{20})$arylalkyloxy, $(C_4-C_{20})$cycloalkyloxide, $(C_5-C_{20})$cycloalkyleneoxide and mixtures thereof. Exemplary, non-limitative epoxide compounds may be one or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrine, epibromohydrin, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal icocyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbonene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidyl-methylphenyl ether, chlorophenyl-2, 3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl normal pentanoate, glycidyl normal hexanoate, glycidyl heptanoate, glycidyl normal octanoate, glycidyl 2-ethyl hexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

The elastomer can be an ethylene-based elastomeric compound such as ethylene-propylene rubber (EPR), ethylene-propylene-diene monomer rubber (EPDM) or styrene-ethylene-butylene-styrene (SEBS) block copolymer, styrene-butadiene rubber (SBR), styrene-butadiene-styrene (SBS)

block copolymer, TPE-E (Thermoplastic polyester elastomer) or TPU (thermoplastic polyurethanes). Other elastomeric compounds which may be used are acrylonitrile, polychloroprene, polyacrylate rubber, polyurethane, chlorinated polyethylene, polyester, poly(isobutylene), copolymers of isobutylene and isoprene, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, and copolymers of methylacrylonitrile and isoprene Still another contribution to achieving the object of the present invention is a process for the preparation of the polymeric matrix, comprising mixing a polymer with the rGO suspension of the invention. The mixing can be done under stirring in solution or compounding the neat polymer with the mixture of the invention, depending on the rheological characteristics. The process can also comprise suspending the polymer and the mixture of the invention in a suitable solvent or, if the polymer is liquid, by mixing the polymer and the mixture of the invention. Mixing is typically done at a temperature above 25° C. to evaporate the organic solvent coming from the mixture of the invention. If possible, the polymer and the mixture of the invention are mixed under high-shear with a high-shearing device, for example a rotor-stator or a dissolver, as described above. High-shearing provides an even better dispersion of the rGO in the polymer, and is suitable for liquid polymers, such as polyols (e.g. polyol polyether). More stable dispersions were obtained with polyol polyethers comprising ethylene oxide and propylene oxide units, for example, polyol polyethers comprising between 0.1 wt % and 20 wt % of ethylene oxide with respect to the total weight of ethylene oxide and propylene oxide.

Further, the wet powdered rGO according to the invention also provides excellent dispersion and can also be used to prepare said polymeric matrixes.

The amount of rGO present in the polymeric matrix of the invention can vary according to the specific needs in each case, and can be controlled by the skilled person. The amount of rGO present in the polymeric matrix can be between 0.001 wt % to and 10 wt %, for example, from 0.1 wt % to 3.0 wt %, with respect to the total weight of the polymeric matrix.

The temperature at which the mixture of the invention and the polymer are mixed is typically comprised between 60° C. and 150° C., preferably between 70° C. and 130° C., preferably between 80° C. and 120° C., preferably above 70° C., preferably below 120° C., preferably between 80° C. and 100° C., preferably between 90° C. and 100° C., preferably 95° C. The heating temperature must be sufficient to melt the polymer (if solid) and evaporate the organic solvent present in the suspension or the wet powder of the invention. Thus, the temperature in each case can be adjusted by the skilled person, depending on the melting point of the polymer, among other factors.

It is also within the scope of the present disclosure a mixture (i.e., rGO suspension or wet powdered rGO according to the invention) comprising no surfactants. Compositions disclosed in the prior art, despite their low concentration of graphene, require the use of surfactants to stabilize the suspensions. The inventors have found that the suspensions and the wet powders of the present disclosure are stable without the need of using surfactants, even at very high concentrations. It is further foreseen within the scope of the present disclosure a suspension consisting of a reduced graphene oxide and one or more organic solvents, wherein the concentration of the reduced graphene oxide is above 0.3 mg/mL, for example, comprised between 0.3 mg/mL and 20.0 mg/mL, and wherein the mixture is stable for at least 5 days as measured in a Turbiscan™. In the same way, it is also foreseen within the scope of the present invention a wet powdered rGO consisting of an organic solvent and rGO, and having more than 15.0 mg of reduced graphene oxide per mL, preferably, between 15.0 mg/mL and 60.0 mg/mL, for example, between 15.0 and 25.0 mg/mL, with respect to the total amount of wet powdered rGO, and which is obtainable by a process comprising the steps of:

(a) reacting a graphene oxide aqueous dispersion at a temperature comprised between 60° C.-150° C. at a pH of 7.0 or more, in the presence of a reducing agent, under high shear to reduce the reaction time required to complete the reduction, and to reduce the particle size of the reduced graphene oxide, to obtain an aqueous reduced graphene oxide suspension;

(b) cleaning the aqueous reduced graphene oxide suspension resulting from step (a) with an organic solvent so that during the cleaning the concentration of the reduced graphene oxide is always above 0.3 mg/mL, with respect to the total mixture, and adjusting the final amount of organic solvent, to obtain the wet powdered reduced graphene oxide.

In an alternative aspect of the invention, the suspension of reduced graphene oxide in an organic solvent, is one wherein the concentration of the reduced graphene oxide with respect to the total mixture is above 0.3 mg/mL, preferably, comprised between 0.3 mg/mL and 20.0 mg/mL, and wherein the d90 particle size of the reduced graphene oxide as measured by laser diffraction is less than 100 microns, preferably less than 80 microns, for example, less than 70 microns, less than 50 microns or less than 40 microns. Typical values of d90 that can be obtained in the mixtures of the invention are comprised between 1 micron and 100 microns, for example, between 2 microns and 70 microns, or between 5 microns and 60 microns, or between 5 microns and 50 microns, or between 10 microns and 40 microns.

In an alternative aspect of the invention, the wet powdered reduced graphene, is one having above 15.0 mg, preferably, between 15.0 mg and 60.0 mg, for example, between 15.0 mg and 25.0 mg, of reduced graphene oxide per mL of an organic solvent and obtainable by the steps (a) and (b) as herein described, and wherein the d90 particle size of the reduced graphene oxide as measured by laser diffraction is less than 100 microns, preferably less than 80 microns, for example, less than 70 microns, less than 50 microns or less than 40 microns. Typical values of d90 that can be obtained in the wet powder of the invention are comprised between 1 micron and 100 microns, for example, between 2 microns and 70 microns, or between 5 microns and 60 microns, or between 5 microns and 50 microns, or between 10 microns and 40 microns.

Process

The present invention provides a process for the preparation of rGO products with improved kinetics of the reduction reaction, without the agglomeration of the rGO particles, and yielding a rGO with improved dispersibility in polymeric matrixes. It is not only the resulting suspension suitable for an efficient dispersion in a polymer, but also the intermediate wet powder. The process comprises:

(a) reacting a graphene oxide aqueous dispersion under high shear at a temperature comprised between 60° C.-150° C. at a pH of 7.0 or more, in the presence of a reducing agent, the high shear contributing to reduce the reaction time required to complete the reduction, and to reduce the particle size of the reduced graphene oxide, to obtain an aqueous reduced graphene oxide suspension;

(b) cleaning the reduced graphene oxide suspension resulting from step (a) with an organic solvent so that the concentration of the reduced graphene oxide is always above 0.3 mg/mL, with respect to the total mixture, to obtain a wet powdered reduced graphene oxide, preferably, having a concentration above 15.0 mg/mL, preferably, between 15.0 mg/mL and 60.0 mg/mL, for example, between 15.0 mg/mL and 25.0 mg/mL; and (c) re-dispersing the wet powdered reduced graphene oxide obtained in step (b) in an organic solvent to obtain the suspension.

The re-dispersion of step (c) is preferably done under high shear.

The present invention further provides a process for the preparation of a wet powdered reduced graphene oxide in an organic solvent, having a concentration of reduced graphene oxide of more than 15.0 mg/mL, comprising the steps of:

(a) reacting a graphene oxide aqueous dispersion at a temperature comprised between 60° C.-150° C. at a pH of 7.0 or more, in the presence of a reducing agent, under high shear to reduce the reaction time required to complete the reduction, and to reduce the particle size of the reduced graphene oxide, to obtain a reduced graphene oxide suspension;

(b) cleaning the reduced graphene oxide suspension resulting from step (a) with an organic solvent so that during the cleaning the concentration of reduced graphene oxide is always above 0.3 mg/mL, with respect to the total mixture, and adjusting the final amount of organic solvent to obtain the wet powdered reduced graphene oxide.

The high shear applied in the methods or processes of the present invention (i.e., in step (a) of both the processes for the preparation of a rGO suspension and of wet powdered rGO, or previous to step (a) or during the re-suspension of step (c)) is preferably achieved with a high-shear mixer, preferably a rotor-stator. A high-shear mixer uses a rotating impeller or high-speed rotor, typically powered by an electric motor, which creates flow and shear. In a high shear mixer, the speed of the fluid in the outer diameter of the rotor is higher than the velocity at the centre of the rotor, and it is this velocity difference that creates shear. A stationary component is used in combination with the rotor, and is referred to as the stator. The stator creates a close-clearance gap between the rotor and itself and forms an extremely high-shear zone for the material as it exits the rotor. Preferably, high shear mixing is performed at more than 1000 rpm, preferably, at more than 1,200 rpm or more than 1,300 rpm, for example, between 1,000 rpm and 5000 rpm.

The introduction of high shear mixing in the processes of the present invention considerably improves the reaction kinetics since much shorter reaction times are required to complete the reduction. In addition, using high shear avoids the agglomeration of the reduced graphene oxide. One of the most critical issues in the reduction of the graphene oxide is the tendency of the flakes to agglomerate as the oxygen functionality is reduced with the reduction reaction. Therefore, the present invention discloses, in a preferred embodiment, a method in which the exfoliation and reduction of the graphene oxide are simultaneous.

In a preferred embodiment of the processes of the present invention the concentration of the graphene oxide aqueous dispersion in step (a) is between 0.01 mg/mL and 10 mg/mL, preferably 0.05-5 mg/mL, preferably between 2 mg/mL and 5 mg/mL. Preferably, the GO has been subjected itself to a high-shear process prior to the reduction reaction.

In principle, any base can be used to adjust the pH of the high sheared graphene oxide aqueous dispersion. Preferably, the base is selected from NaOH, KOH, RbOH, CsOH, $Ca(OH)_2$, $Ba(OH)_2$, $Mg(OH)_2$, $NH_3$, $N(C_2H_5)_3$, $N(CH_3)_3$, pyridine, urea. For example, the base can be ammonia ($NH_3$). The reaction proceeds under basic conditions (pH of 7.0 or more), for example, between 7.0 to 11.0, preferably between 8.0 to 10.0, more preferably the pH value is about 9.0.

Virtually any suitable reducing agent can be used to reduce the GO. Suitable reducing agents can be found in C. K. Chua and M. Pumera, Chem. Soc. Rev. (2014). For example, the reducing agent is selected from the group of borohydrides such as $NaBH_4$, $NaBH_3(CN)$, $NaBH(OAc)_3$, $NH_3BH_3$; aluminium hydride such as $LiAlH_4$; hydrohalic acids such as HI/AcOH, HI/TFA, HI, HBr, HBr-KOtBu; sulphur-containing reducing agents such as thiourea dioxide/NaOH, thiourea dioxide/NaOH/cholate, thiourea dioxide/$NH_3$, ethanethiol/$AlCl_3$, Lawesson's reagent, $NaHSO_3$, $Na_2S_2O_4$/NaOH, thiourea, thiophene; nitrogen-containing reducing agents such as hydrazine, phenylhydrazine, hydroxylamine/$NH_3$, hydroxylamine, pyrrole, benzylamine, p-phenylene diamine, ethylenediamine, urea/$NH_3$, dimethyl ketoxime/$NH_3$, hexamethylenetetramine, polyelectrolyte, poly(amido amine); oxygen containing reducing agents such as methanol, ethanol, isopropyl alcohol, benzyl alcohol, hydroquinone, L-ascorbic acid/L-tryptophan/NaOH, L-ascorbic acid (vitamin C), L-ascorbic acid/$NH_3$, glucose/$NH_3$, dextran/$NH_3$; metal-alkaline combinations such as Zn/$NH_3$, Zn/NaOH; amino acids such as L-cysteine, glycine, L-lysine, L-glutathione; plant extracts such as green tea, *C. esculenta* leaf, *M. ferrea Linn.* leaf, *C. sinensis* peel, *R. damascena*; microorganisms such as *Shewanella*, *E. coli* culture, *E. coli* biomass, Baker's yeast/NADPH, wild carrot roots; proteins such as bovine serum albumin/NaOH and hormones such as melatonin/$NH_3$. Preferably, the reducing agent is selected from the group of hydrazine and vitamin C. More preferably the reducing agent is vitamin C.

Typically, the reduction reaction requires heating, the exact temperature depending on the reagents used and the conditions, and the skilled person can adjust the ideal temperature in each case. Usually the temperature is between 70° C. and 130° C., for example between 80° C. and 120° C., preferably above 70° C., preferably below 120° C., preferably between 80° C. and 100° C., preferably between 90° C. and 100° C., preferably 95° C.

Suitable organic solvents for cleaning the rGO in step (b) in any of the processes according to the invention are selected from the group of EtOH, MeOH, iPrOH, BuOH, $CH_2Cl_2$, $CHCl_3$, ethyl ether, Etyl acetate, DMF, NMP, DMSO. The organic solvent may be a single organic solvent, or a mixture of organic solvents. Preferably the organic solvents are selected from the group of N,N'-dimethylformamide (DMF), N-methylpyrrolidine (NMP) and alcohols. Preferred organic solvents are alcohols from the group of methanol, ethanol and isopropanol. More preferably methanol is the organic solvent of choice. The cleaning step involves substituting, as much as possible, the water of the aqueous rGO suspension obtained in step (a) by the organic solvent. Further, in the cleaning step as much residual reactants are eliminated, e.g. residual reducing agent or bases used to adjust the pH in the reduction step (a). The cleaning process can be adjusted to obtain a mixture having different concentrations of rGO, i.e., the final amount of organic solvent contained in the wet powdered rGO may be adjusted. Said cleaning solvent is typically the same used as organic solvent in the suspension of the invention, that is, in the re-suspension of the wet powdered rGO.

The cleaning step (b) in any of the processes of the invention is performed in such a way that prevents the drying of the rGO. This is achieved by maintaining the concentration of rGO in organic solvent above 0.3 mg/mL of mixture at any given time. For example, above 0.5 mg/mL, or above 1.0 mg/ml. Cleaning can be performed for example in an extractor for solids. Typical extractors are the Soxhlet extractor or the Kumagawa extractor. As indicated above, the final amount of organic solvent may be adjusted in order to obtain the wet powdered rGO. As anyone skilled in the art will readily know, this may be intrinsically achieved by the cleaning process, e.g. if carried out in a Soxhlet extractor, which constantly and simultaneously carries out washing with organic solvent and filtering of the rGO; that is, a wet powdered rGO is directly obtained if the cleaning step (b) is carried out in a Soxhlet extractor or equivalent procedures. As anyone skilled in the art will know, alternatively the aqueous rGO suspension obtained in step (a) may be filtered, and the obtained filtered rGO may then be washed with the organic solvent, and again filtered. The latter washing and filtering steps may be repeated if considered necessary, until as a last step the amount of organic solvent is adjusted in a manner that a wet powdered rGO (that is, having a concentration of rGO in organic solvent above 15 mg/mL) is obtained. Equivalent methods, such as centrifuging and decanting, evaporating, or any other known methods which allow separating a solid from a liquid, may be used, in order to carry out the cleaning step (b) of the processes of the invention and arrive at the final concentration of rGO in organic solvent above 15 mg/mL.

Once clean, in the case of preparing a rGO suspension, the wet powdered rGO is re-suspended in an organic solvent to obtain the suspension of the invention. Re-suspension preferably comprises high shearing. The suspension is stable for long periods of time and, even after some sedimentation, it can re-submitted to high shearing to recover an homogeneous suspension.

The suspension so obtained can be filtered to remove any possible large particle.

Another contribution to achieving the object of the present invention is made by an rGO obtainable by the processes according to the invention.

Another contribution to achieving the object of the present invention is a suspension of reduced graphene oxide in an organic solvent, wherein the concentration of the reduced graphene oxide is above 0.3 mg/mL, preferably, comprised between 0.3 mg/mL and 20.0 mg/mL, and wherein the suspension is stable for at least 5 days as measured in a Turbiscan™, stable meaning that the variation of the transmittance measured in the Turbiscan™ is less than 10% after 5 days; and wherein the mixture is obtainable by a process, comprising the steps of:

(a) reacting a graphene oxide aqueous dispersion at a temperature comprised between 60° C.-150° C. at a pH of 7.0 or more, in the presence of a reducing agent, under high shear to reduce the reaction time required to complete the reduction, and to reduce the particle size of the reduced graphene oxide, to obtain an aqueous reduced graphene oxide suspension;

(b) cleaning the aqueous reduced graphene oxide suspension resulting from step (a) with an organic solvent so that the concentration of reduced graphene oxide organic is always above 0.3 mg/mL, with respect to the total mixture, to obtain a wet powdered reduced graphene oxide, preferably, having a concentration above 15.0 mg/mL, for example, comprised between 16.0 mg/mL and 25.0 mg/mL; and (c) re-dispersing the wet powdered reduced graphene oxide obtained in step (b) in an organic solvent to obtain the suspension.

Even another contribution by the present invention is a suspension of reduced graphene oxide in an organic solvent, wherein the concentration of the reduced graphene oxide is above 0.3 mg/mL, with respect to the total amount of suspension, and wherein the suspension is stable for at least 5 days as measured in a Turbiscan™, stable meaning that the variation of the transmittance measured in the Turbiscan™ is less than 10% after 5 days. Preferably, the concentration of the reduced graphene oxide is above 1 mg/mL; for example, the concentration of the reduced graphene oxide is comprised between 1 mg/mL and 10 mg/mL. In the rGO of the invention the d90 particle size of the reduced graphene oxide as measured by laser diffraction may be between 2 microns and 70 microns. According to a particular embodiment thereof, the organic solvent is methanol.

A further contribution by the present invention is a wet powdered reduced graphene oxide in an organic solvent, that is, having a concentration of reduced graphene oxide of more than 15.0 mg/mL, with respect to the total amount of wet powdered rGO, wherein the d90 particle size of reduced graphene oxide as measured by laser diffraction is between 2 and 70 microns. According to a particular embodiment thereof, the concentration of reduced graphene oxide may be between 16.0 and 25.0 mg/mL, with respect to the total amount of wet powdered rGO.

The rGO suspensions and the wet powdered reduced graphene oxide as provided in the present invention can be used for different applications, throughout the fields of, for example, medicine, electronics, light processing, energy, sensors, or environmental. Some none limitative applications are in tissue engineering, as contrast agents, drug delivery, in transistors, circuits, conductive inks, coatings, paints, pressure sensors, water filtration, composites and many more.

EXAMPLES

The following examples are provided with the intent of further illustrating the present invention, but should in no case be interpreted as to be limiting of the present invention.

Example 1: Synthesis of Reduced Graphene Oxide 1.5 L of 4 mg/mL graphene oxide dispersion were placed in a 2 L aluminum flask. Then 1 mL of $NH_3$ and 3 g of ascorbic acid were added and the dispersion was mixed at 1600 rpm, under high shear in a Dispermat® device, and at 95° C. (heated with a hot plate, temperature controlled by the Dispermat® CN30F2 device) during 1 h. The reaction was cooled down to room temperature and after that, the suspension was filtered. The black wet powder was then cleaned in a soxhlet system with methanol overnight. In this way the sample was never allowed to dry and resulted in a stable wet powder. Re-suspension under high shear of said wet powder in methanol provided a suspension of rGO at a concentration of 8 mg/mL. These rGO suspensions were stable for at least 5 days.

Example 2: Synthesis of the Polymeric Matrix with rGO Dispersed Therein

Different polymer matrixes were prepared following the procedure below.

The polymer (200 g) was placed in a Dispermat® (high shear) flask. The matrix was heated with a hot plate up to 80° C. and stirred at 800 rpm. The rGO/MeOH dispersion prepared in example 1 (8 mg/mL) was then added in portions to the polymer and it was kept overnight to be sure that all the MeOH was evaporated. The final polymer matrix had a 1 wt % concentration of rGO.

The polymers used in each case were: (i) an epoxy resin; (ii) Polyol 1; and (iii) Polyol 4 (see example 4 for a description).

Figure 2:
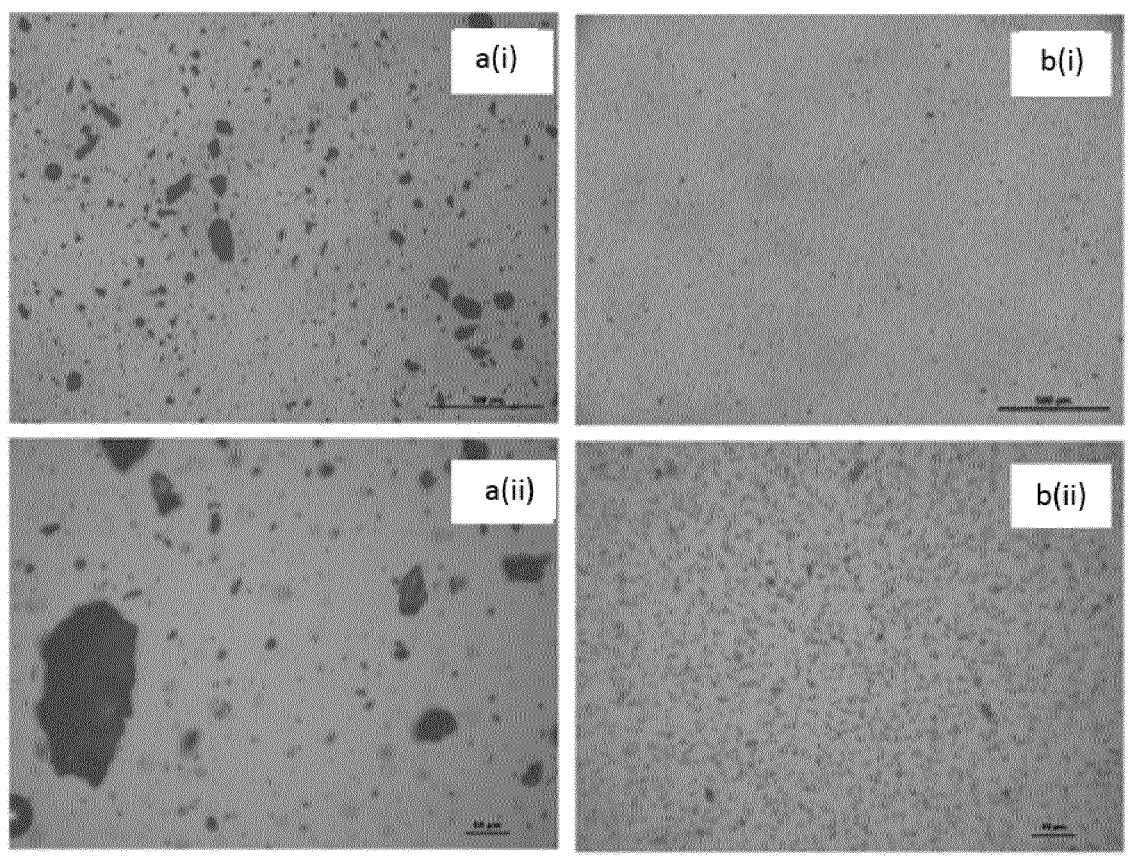
FIG. 2: Optical microscope images of the samples of FIG. 1. Difference between the rGO mixed with a polymer matrix; (a) rGO dried in a standard vacuum oven; (b) adding directly in a suspension and evaporating the solvent. It is clearly observed how the addition of the suspension followed by the in situ evaporation of the solvent prevents the particles from agglomerating. In image a(i) and b(i) the bar scale is 500 microns. In image a(ii) and b(ii) the bar scale is 50 microns.

The resulting polymer matrixes presented a much better dispersion. This could be appreciated even by naked eye, as shown in FIGS. 1 and 2.

Example 3: Results of the Mixtures of rGO with Solvent and Comparison Between High-Shear Mixing and Standard Shearing in Highly Concentrated rGO Suspensions In order to test the process of the invention and the properties of the rGO so obtained, different mixtures of rGO in methanol (8 mg/mL) were prepared. First, the reduction step was carried out, either using standard mechanical stirring (comparative samples/conditions 1 and 2, Table 1) or a high shear mixer. The starting GO solution having 4.0 mg/mL of GO, which is a much higher concentration than those disclosed in the prior art, which typically is of about 0.1 mg/mL. The temperature was maintained at 95° C., while different stirring methods, reaction times and velocities were tested. The results are shown in Table 1. In this table it is clearly shown how the high shear mixer improves the mixing between the reactants and reduces the reaction time to up to half of the time. More surprisingly, high-shearing provides higher yields. In addition, the reduction occurs more effectively and the oxygen content is lower when a high-shear mixer is used. This can be observed when comparing the oxygen content of the comparative samples 1 and 2 (15% Oxygen) with those of samples prepared according to the process of the present invention 3 to 6 (9-13% oxygen).

TABLE 1

| Conditions | Tool | Parameters | | | |
|---|---|---|---|---|---|
| | | rpm/ energy | t (min) | Product yield (%) | Oxygen content (%) |
| 1 (comp.) | Mechanical stirrer | 1000 | 90 | 75 | 15 |
| 2 (comp.) | Mechanical stirrer | 1500 | 90 | 75 | 15 |
| 3 | High shear mixer | 1000 | 45 | 75 | 13 |
| 4 | High shear mixer | 1500 | 45 | 80 | 12 |
| 5 | High shear mixer | 2800 | 45 | 85 | 9 |
| 6 | High shear mixer | 5000 | 45 | 91 | 9 |

Further, a notable improvement was observed in the particle size (measured by laser diffraction).

The laser diffraction analysis was carried out in a MALVERN Mastersizer 2000 equipment. The dispersing medium was methanol. The estimated refractive index for graphene is 2.417. No pre-treatment of the samples was performed. Laser diffraction analysis involves the realization of 5 measurements. The final result corresponds to the mean of these 5 results for each sample and is presented in the form of index d10, d50 and d90 (% vol).

The results are shown in Table 2.

TABLE 2

| rGO | $d_{10}$ (microns) | $d_{50}$ (microns) | $d_{90}$ (microns) |
|---|---|---|---|
| Standar stirring (dried) | 10.3 | 58.9 | 200 |
| Standard stirring (in MeOH) | 8.1 | 32.4 | 118.3 |
| High shear mixer (in MeOH) | 2.1 | 6.9 | 21.6 |

Also, the smaller particle size of the rGO produced in the invention is clearly visible to the naked eye, indicating less agglomeration of the particles. As shown in FIG. 1 in a polymer matrix prepared according to the present invention by mixing the polymer with a mixture according to the invention (in the form of a wet slurry), the material was totally integrated in the matrix (sample (b)), whereas in the sample (a) prepared by mixing dry rGO with the polymer, agglomerates were observed. This improvement was further confirmed by optical microscope, as shown in FIG. 2.

Figure 3:
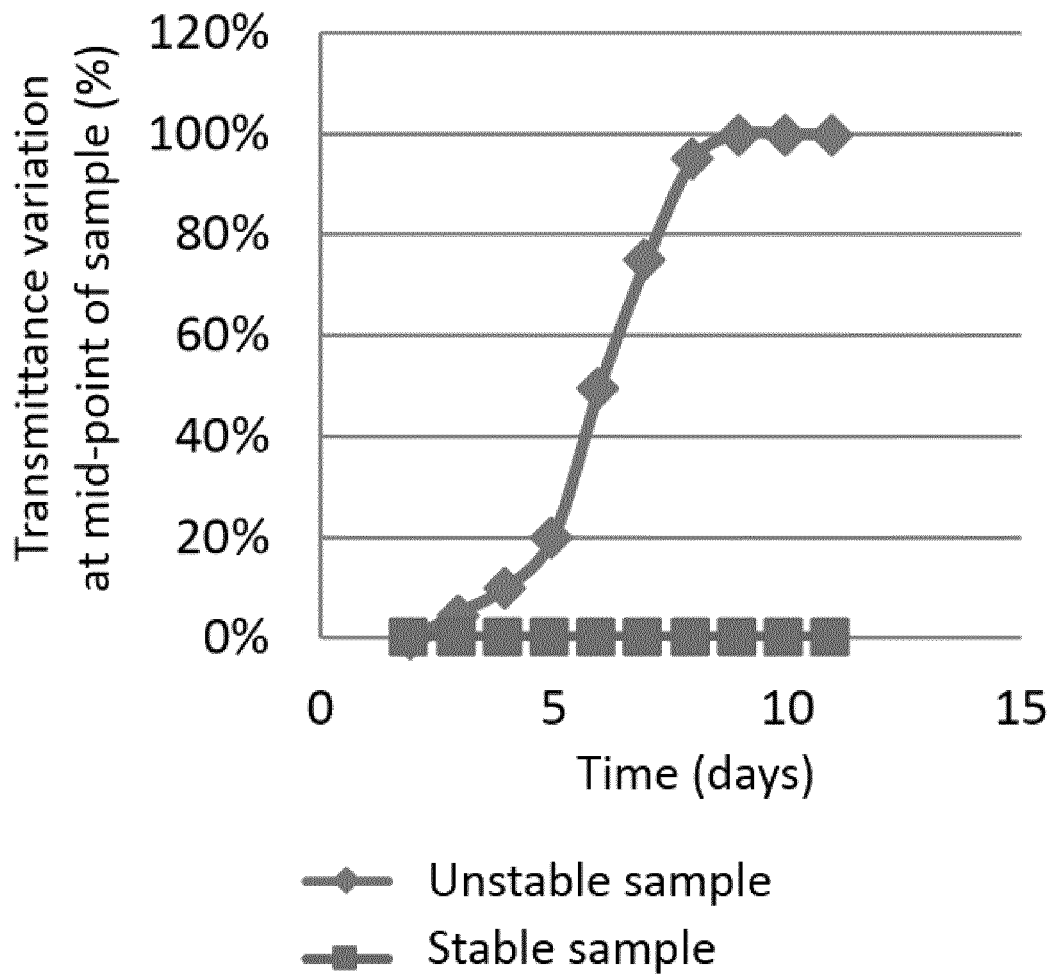
FIG. 3: Plot of the percentage of variation of the transmittance over time in a suspension or liquid polymer matrix of the invention. Squares represent stable samples, that is, those wherein the transmittance does not change over time. Diamonds represent unstable samples, wherein the transmittance changes over time.

In order to obtain a precise measurement of the stability of the products obtained, whether it is a suspension according to the invention or a liquid polymer matrix containing the rGO described herein, the stability was measured in a Turbiscan™. Immediately after preparation each sample was placed in a cell having a diameter of 2 cm and a height of 40 mm, and analyzed in the Turbiscan™. The Turbiscan™ irradiated the sample at a given height of the sample, in this case at the middle (20 mm) with a laser wave length of 800 nm, to stablish the base line of transmittance (also called the "cero"). This procedure under the same conditions was repeated for the sample being analyzed at different times. A stable sample displays a flat curve over time, meaning that the transmittance through the sample does not change over time, and therefore the particles are evenly distributed throughout the suspension with no significant changes at any given point. As the suspension becomes unstable, the particles start to aggregate and deposit towards the bottom of the cell. As a result, the measured transmission changes over time. This variation of the transmittance was plotted against time as a percentage of change per time unit (see FIG. 3). samples were allowed to stand at 25° C. in the dark for different periods of time ranging from a few minutes to months. All measurements were performed at 25° C. and 1 atm, and always under the same conditions for a given sample. A sample was considered stable if the variation of the transmittance was less than 10% after 5 days. All mixtures prepared according to the invention under high shear (entries 3, 4, 5 and 6 of Table 1) were stable for at least 5 days under the above conditions. On the other hand, mixtures prepared under standard conditions (comparative entries 1 and 2 of Table 1) were unstable, even after only a few hours.

Example 4: Polymer Matrix Using Polyol Polyethers and Thermoplastic Polyurethanes In a first test, polymers where mixed with dry rGO, resulting in unstable mixtures. On the other hand, a suspension according to the invention was mixed with different polyols under high shear, and the solvent (methanol) evaporated (total evaporation was tested for mixtures C and E using DSC). The resulting polymer matrix (1 wt % of rGO with respect to the total weight of the polymer and rGO) was stable over the period of observation, i.e. for at least two months as measured with the Turbiscan™ following the methods described above. A summary of the results can be found in Table 3.

| Polymer | rGO form | Polymer matrix | Filtration | Stable? |
|---|---|---|---|---|
| Polyol 1 | Dry Powder | — | — | NO |
| Polyol 2 | (Comparative) | — | — | NO |
| Polyol 3 |  | — | — | NO |
| Polyol 1 | Suspension in Methanol | A | NO | YES |
| Polyol 4 | according to the invention | B | NO | YES |
| Polyol 1 |  | C | YES | YES |
| Polyol 4 |  | D | YES | YES |
| Polyol 5 |  | E | YES | YES |

Polyol 1 (Alcupol F5511): triol co-polymer of ethylene oxide and propylene oxide; IOH = 55 mgKOH/g; average molecular weight = 3000 Da; viscosity at 25° C. = 490 cP
Polyol 2 (Alcupol F3231): triol co-polymer of ethylene oxide and propylene oxide; IOH = 32 mgKOH/g
Polyol 3 (Alcupol F3531): triol co-polymer of ethylene oxide and propylene oxide; IOH = 35 mgKOH/g; viscosity at 25° C. = 800 cP
Polyol 4 (Alcupol D2021): polypropylene glycol; average molecular weight = 2000 Da; IHO = 56 mgKOH/g; viscosity at 25° C. = 300 cP.
Polyol 5 (Alcupol D1011): polypropylene glycol; average molecular weight = 1000 Da; IHO = 110 mgKOH/g; viscosity at 25° C. = 150 cP.

In all polymer matrixes according to the invention, an increase in the viscosity with respect to the neat polymer was observed. For example, the viscosity of Polyol 1 was 490 cP, while the viscosity of the polymer matrix C was 4,079 cP; polyol 5 had a viscosity of 150 cP, while polymer matrix E 747 cP. Polymer matrices C and E were used to obtain thermoplastic polyurethane foams by polymerization with methylene diphenyl diisocyanate (MDI) and butanediol (BD).

Example 5: Polymer Matrix from Wet Powdered rGO and Epoxy Resin

Figure 4:
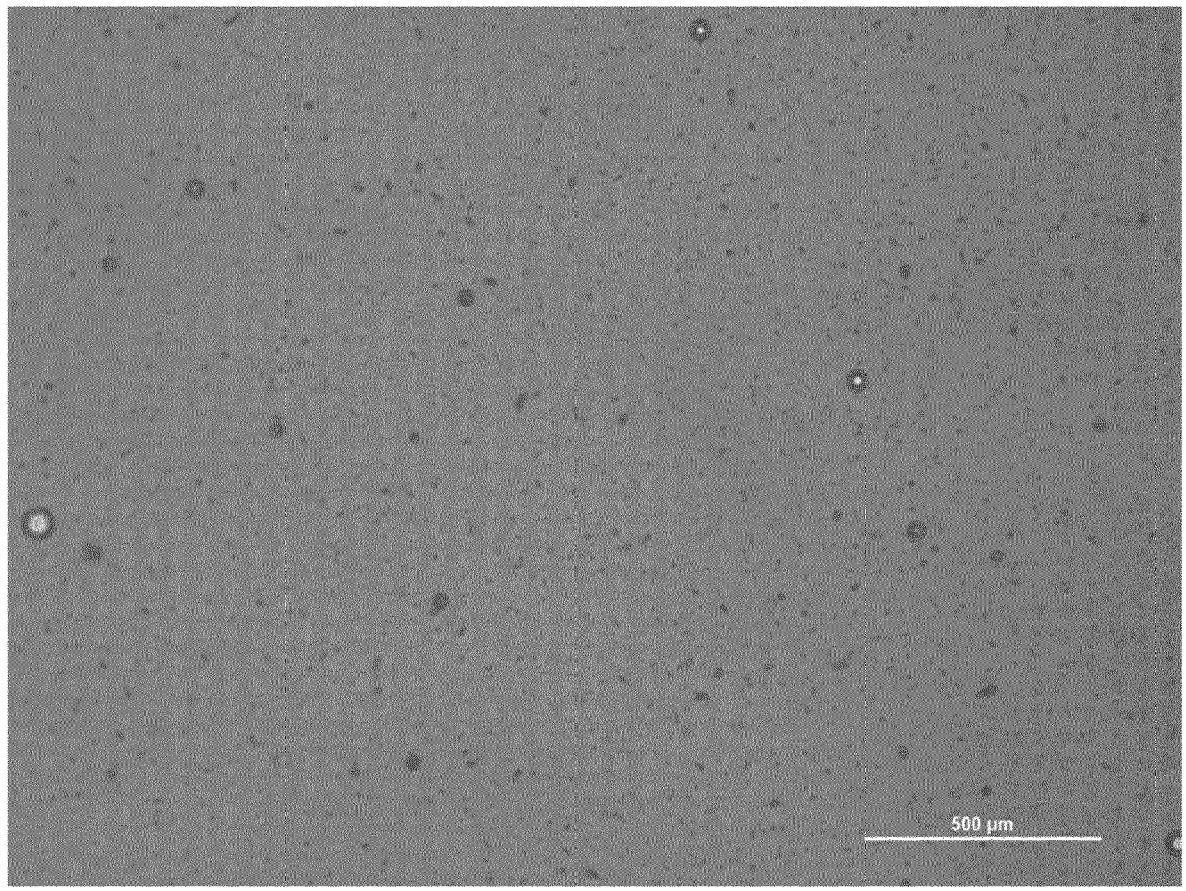
FIG. 4: optical microscope image of a mixture of a wet powder according to the invention with an epoxy resin.

The wet powder obtained in example 1 (product before re-suspension having a concentration of 17 mg/mL) was mixed in a Dispermat® with an epoxy resin and the residual solvent evaporated. As observed in FIG. 4, the optical microscope image shows a homogeneous dispersion of finely grained rGO. Similar results were obtained with wet powdered rGO in concentrations of up to 200 mg/mL.

The invention claimed is:

1. A process for the preparation of a suspension of a reduced graphene oxide in an organic solvent, wherein the concentration of the reduced graphene oxide is above 0.3 mg/mL, and wherein the suspension is stable for at least 5 days as measured in an optical dispersion analyzer based on static Multiple Light Scattering, stable meaning that the variation of the transmittance measured in the optical dispersion analyzer is less than 10% after 5 days, said process comprising the steps of:
   (a) reacting a graphene oxide aqueous dispersion at a temperature between 70° C.-150° C. at a pH of 7.0 or more, in the presence of a reducing agent, under high shear to reduce the reaction time required to complete the reduction, and to reduce the particle size of the reduced graphene oxide, to obtain an aqueous reduced graphene oxide suspension, wherein the high shear is achieved with a high-shear mixer at more than 1000 rpm;
   (b) cleaning the aqueous reduced graphene oxide suspension resulting from step (a) with an organic solvent so that the concentration of reduced graphene oxide is always above 0.3 mg/mL, with respect to the total mixture, to obtain a wet powdered reduced graphene oxide; and
   (c) re-dispersing the wet powdered reduced graphene oxide obtained in step (b) in an organic solvent to obtain the suspension.

2. The process according to claim 1, wherein the organic solvent of step (b) is the same as the organic solvent of step (c).

3. The process according to claim 2, wherein the organic solvent is methanol.

4. The process according to claim 1, wherein the graphene oxide aqueous dispersion is high sheared prior to step (a).

5. The process according to claim 1 wherein the reducing agent is selected from the group consisting of vitamin C and hydrazine.

6. A process for the preparation of a wet powdered reduced graphene oxide in an organic solvent, having a concentration of reduced graphene oxide of more than 15.0 mg/mL, comprising the steps of:
   (a) reacting a graphene oxide aqueous dispersion at a temperature between 70° C.-150° C. at a pH of 7.0 or more, in the presence of a reducing agent, under high shear to reduce the reaction time required to complete the reduction, and to reduce the particle size of the reduced graphene oxide, to obtain an aqueous reduced graphene oxide suspension, wherein the high shear is achieved with a high-shear mixer at more than 1000 rpm;
   (b) cleaning the aqueous reduced graphene oxide suspension resulting from step (a) with an organic solvent so that during the cleaning the concentration of reduced graphene oxide is always above 0.3 mg/mL, with respect to the total mixture, and adjusting the final amount of organic solvent to obtain the wet powdered reduced graphene oxide.

* * * * *